United States Patent
Sugawara et al.

(10) Patent No.: US 10,998,137 B2
(45) Date of Patent: May 4, 2021

(54) ELECTROLYTIC CAPACITOR AND METHOD FOR MANUFACTURING ELECTROLYTIC CAPACITOR

(71) Applicant: TOKIN Corporation, Sendai (JP)

(72) Inventors: Yasuhisa Sugawara, Sendai (JP); Masami Ishijima, Sendai (JP); Kenji Araki, Sendai (JP)

(73) Assignee: TOKIN CORPORATION, Sendai (JP)

( * ) Notice: Subject to any disclaimer, the term of this patent is extended or adjusted under 35 U.S.C. 154(b) by 18 days.

(21) Appl. No.: 16/054,554

(22) Filed: Aug. 3, 2018

(65) Prior Publication Data

US 2019/0333704 A1 Oct. 31, 2019

(30) Foreign Application Priority Data

Apr. 26, 2018 (JP) .............................. JP2018-084761

(51) Int. Cl.
| | | |
|---|---|---|
| *H01G 9/07* | (2006.01) | |
| *H01G 9/04* | (2006.01) | |
| *H01G 9/10* | (2006.01) | |
| *H01G 9/00* | (2006.01) | |
| *H01G 9/035* | (2006.01) | |

(52) U.S. Cl.
CPC ............. *H01G 9/07* (2013.01); *H01G 9/0032* (2013.01); *H01G 9/035* (2013.01); *H01G 9/04* (2013.01); *H01G 9/10* (2013.01)

(58) Field of Classification Search
CPC .. H01G 9/07; H01G 9/04; H01G 9/10; H01G 9/15; H01G 9/0032; H01G 9/035

USPC .......................................... 361/523, 525, 526
See application file for complete search history.

(56) References Cited

U.S. PATENT DOCUMENTS

| 2006/0181835 A1 | 8/2006 | Murakami et al. |
| 2008/0304208 A1 | 12/2008 | Murakami et al. |
| 2011/0211294 A1 | 9/2011 | Ueda |
| 2015/0085428 A1* | 3/2015 | Kosuge .................... H01G 9/07 |
| | | 361/524 |

FOREIGN PATENT DOCUMENTS

| CN | 104428856 A | 3/2015 |
| JP | 2006024708 A | 1/2006 |

(Continued)

OTHER PUBLICATIONS

Japanese Patent Office, Office Action Issued in Application No. 2018084761, dated Jun. 19, 2018, 7 pages.

(Continued)

*Primary Examiner* — Arun Ramaswamy
(74) *Attorney, Agent, or Firm* — McCoy Russell LLP (57) ABSTRACT

An electrolytic capacitor according to an aspect of the present disclosure includes a valve metal, a dielectric oxide film layer formed on a surface of the valve metal, a surface treatment agent layer formed on the dielectric oxide film layer, and an electrolyte layer formed on the surface treatment agent layer. The electrolyte layer includes a conductive polymer layer and an ionic liquid. For example, the conductive polymer layer is formed so that the conductive polymer layer is in contact with the surface treatment agent layer, and at least some of voids present in an interface between the conductive polymer layer and the surface treatment agent layer are filled with the ionic liquid.

5 Claims, 7 Drawing Sheets

(56) References Cited

FOREIGN PATENT DOCUMENTS

| JP | 2008218920 A | 9/2008 |
| JP | 2011181610 A | 9/2011 |
| WO | 2005012599 A1 | 2/2005 |

OTHER PUBLICATIONS

China National Intellectual Property Administration, Office Action and Search Report Issued in Application No. 201811038832.7, dated Nov. 24, 2020, 21 pages.

\* cited by examiner

| | Surface Treatment Agent | (Group that bonds to organic material) | Ion Liquid | Manufacturing Condition | Cap Appearance Ratio | ESR (INI) | ESR changing rate |
|---|---|---|---|---|---|---|---|
| Example 1 | Silane coupling agent | KBM-403 (glycidyl) | EMI-TFSI | Manufacturing Method 1 | 95% | 62mΩ | 2.0 |
| Example 2 | Silane coupling agent | KBM-903 (amino) | EMI-TFSI | Manufacturing Method 1 | 94% | 64mΩ | 1.9 |
| Example 3 | Silane coupling agent | KBM-1403 (styryl) | EMI-TFSI | Manufacturing Method 1 | 89% | 65mΩ | 2.0 |
| Example 4 | Silane coupling agent | KBM-403 (glycidyl) | EMI-ES | Manufacturing Method 1 | 93% | 71mΩ | 2.0 |
| Example 5 | Silane coupling agent | KBM-403 (glycidyl) | BMP-TFS | Manufacturing Method 1 | 94% | 70mΩ | 1.9 |
| Example 6 | Titanate coupling agent | Plenact 44 (amino) | EMI-TFSI | Manufacturing Method 1 | 95% | 62mΩ | 2.0 |
| Example 7 | Phosphonic acid derivative | 10-CDPA (carboxylic acid) | EMI-TFSI | Manufacturing Method 1 | 95% | 61mΩ | 2.0 |
| Example 8 | Phosphonic acid derivative | ODPA (alkyl) | EMI-TFSI | Manufacturing Method 1 | 88% | 65mΩ | 2.1 |
| Example 9 | Silane coupling agent | KBM-403 (glycidyl) | EMI-TFSI | Manufacturing Method 2 | 95% | 44mΩ | 1.2 |
| Example 10 | Silane coupling agent | KBM-403 (glycidyl) | EMI-TFSI | Manufacturing Method 3 | 95% | 47mΩ | 1.2 |

| | Surface Treatment Agent | Ion Liquid | Manufacturing Condition | Cap Appearance Ratio | ESR(INI) | ESR changing rate |
|---|---|---|---|---|---|---|
| Comparative Example 1 | N/A | EMI-TFSI | Manufacturing Method 1 (without surface treatment agent) | 85% | 63mΩ | 2.0 |
| Comparative Example 2 | N/A | EMI-ES | Manufacturing Method 1 (without surface treatment agent) | 85% | 73mΩ | 2.0 |
| Comparative Example 3 | N/A | BMP-TFS | Manufacturing Method 1 (without surface treatment agent) | 84% | 73mΩ | 2.0 |
| Comparative Example 4 | N/A | EMI-TFSI | Manufacturing Method 4 | 81% | 97mΩ | 4.7 |
| Comparative Example 5 | N/A | EMI-TFSI | Manufacturing Method 4 (including washing) | 78% | 55mΩ | 1.3 |
| Comparative Example 6 | N/A | BMP-TFS | Manufacturing Method 5 | 76% | 120mΩ | 5.1 |
| Comparative Example 7 | N/A | BMP-TFS | Manufacturing Method 5 (including washing) | 73% | 78mΩ | 1.7 |

ELECTROLYTIC CAPACITOR AND METHOD FOR MANUFACTURING ELECTROLYTIC CAPACITOR

INCORPORATION BY REFERENCE

This application is based upon and claims the benefit of priority from Japanese patent application No. 2018-084761, filed on Apr. 26, 2018, the disclosure of which is incorporated herein in its entirety by reference.

BACKGROUND

The present disclosure relates to an electrolytic capacitor and a method for manufacturing an electrolytic capacitor. In particular, the present disclosure relates to an electrolytic capacitor containing an ionic liquid in an electrolyte layer and a method for manufacturing such an electrolytic capacitor.

In recent years, electrolytic capacitors have been widely used in various fields such as electronic devices. International Patent Publication No. WO 2005/012599 discloses a technique for forming an electrolytic capacitor by anodizing a surface of a metal or its alloy using a solution containing an ionic liquid and thereby forming an oxide film on the surface. In the technique disclosed in International Patent Publication No. WO 2005/012599, the oxide film is formed on the metal surface by anodizing the metal surface using the ionic liquid for the purpose of repairing the oxide film.

Japanese Unexamined Patent Application Publication No. 2011-181610 discloses a method for manufacturing a solid electrolytic capacitor, in which a dielectric film is formed on a surface of an anode body, and first and second conductive polymer layers are formed on the dielectric film.

SUMMARY

The present inventors have found the following problem. As described above, electrolytic capacitors are widely used in various fields such as electronic devices. However, as sizes of such electronic devices have been reduced in recent years, sizes of electrolytic capacitors have also been reduced. Therefore, it is necessary more than ever to reduce the size of an electrolytic capacitor while maintaining its capacitance, and hence to improve a capacitance appearance ratio per unit volume of the electrolytic capacitor.

In view of the above-described problem, an object of the present disclosure is to provide an electrolytic capacitor having a high capacitance appearance ratio and a method for manufacturing such an electrolytic capacitor.

A first exemplary aspect is an electrolytic capacitor including: a valve metal; a dielectric oxide film layer formed on a surface of the valve metal; a surface treatment agent layer formed on the dielectric oxide film layer; and an electrolyte layer formed on the surface treatment agent layer. The electrolyte layer includes a conductive polymer layer and an ionic liquid.

Another exemplary aspect is a method for manufacturing an electrolytic capacitor, including: forming a dielectric oxide film layer on a surface of a valve metal; forming a surface treatment agent layer on the dielectric oxide film layer; forming a conductive polymer layer on the surface treatment agent layer; and impregnating the conductive polymer layer with an ionic liquid.

According to the present disclosure, it is possible to provide an electrolytic capacitor having a high capacitance appearance ratio and a method for manufacturing such an electrolytic capacitor.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 5 is a table for explaining samples according to examples and comparative examples;

DESCRIPTION OF EMBODIMENTS

<Electrolytic Capacitor>

Embodiments according to the present disclosure are described hereinafter with reference to the drawings.

Figure 1:
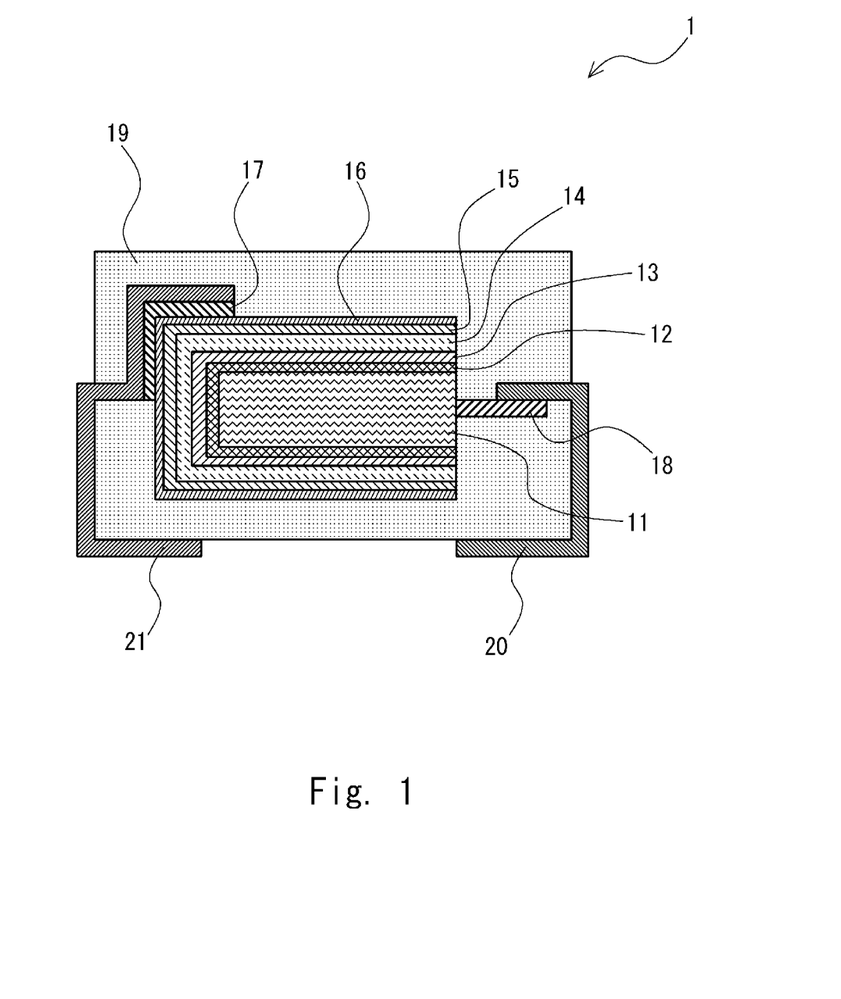
FIG. 1 is a cross section for explaining an electrolytic capacitor according to an embodiment.

FIG. 1 is a cross section for explaining an electrolytic capacitor according to an embodiment.

As shown in FIG. 1, in an electrolytic capacitor 1 according to this embodiment, a dielectric oxide film layer 12, a surface treatment agent layer 13, an electrolyte layer 14, a graphite layer 15, and a silver layer 16 are successively formed on a valve metal 11. The electrolyte layer 14 includes a conductive polymer layer and an ionic liquid.

As shown in FIG. 1, the valve metal 11 includes a valve-metal lead 18 and the valve-metal lead 18 is connected to an electrode 20. For example, the valve-metal lead 18 is connected to the electrode 20 by welding. Further, the silver layer 16 is connected to an electrode 21 with a conductive adhesive 17 interposed therebetween. The electrolytic capacitor 1 according to this embodiment is covered with a packaging resin 19 except for parts of the two electrodes 20 and 21 which are exposed to the outside. Note that in this embodiment, instead of using the electrodes 20 and 21, a capacitor element in which layers up to the silver layer 16 are already formed may be connected to a substrate on which wiring lines are already formed by using the conductive adhesive 17 or welding, and then they may be covered with the packaging resin 19.

The valve metal 11 is formed by, for example, a plate-like, foil-like or linear valve metal, a sintered body containing fine particles of a valve metal, a porous metal that has been subjected to a surface expansion treatment by etching, or the like. As the valve metal 11, for example, at least one type of metal selected from aluminum, tantalum, niobium, tungsten, titanium and zirconium, and alloys of these valve metals can be used.

The dielectric oxide film layer 12 can be formed by electrolytically oxidizing a surface of the valve metal 11.

When the valve metal 11 is a sintered body or a porous metal, the dielectric oxide film layer 12 is also formed in pores (or voids) inside the sintered body or the porous metal. The thickness of the dielectric oxide film layer 12 can be adjusted as appropriate by a voltage of the electrolytic oxidation.

The surface treatment agent layer 13 is formed on the dielectric oxide film layer 12. Specifically, the surface treatment agent layer 13 is formed so that it is in contact with a surface of the dielectric oxide film layer 12. The surface treatment agent layer 13 is preferably at least one type of a substance selected from a silane coupling agent, a titanate coupling agent, and a phosphonic acid derivative. The surface treatment agent constituting the surface treatment agent layer 13 functions as a binder between an inorganic material and an organic material. The surface treatment agent preferably has a molecular structure in which a group that bonds to an inorganic material and a group that bonds to an organic material are included in the same molecule.

In the case of the silane coupling agent, the group that bonds to an inorganic material is, for example, a silanol group. In the case of the titanate coupling agent, the group that bonds to an inorganic material is, for example, a titanium alkoxide. Further, in the case of the phosphonic acid derivative, the group that bonds to an inorganic material is, for example, a phosphonic acid group. Further, examples of the group that bonds to an organic material include an alkyl group, a vinyl group, a phenyl group, a fluorinated alkyl group, a styryl group, a hydroxyl group, an ether group, a glycidyl group, an acryl group, a methacryl group, a ureido group, an isocyanate group, a mercapto group, a carboxyl group, an amino group, a phosphoric acid group, a phosphate group, etc. Note that in consideration of the strength of the interaction between the ionic liquid and the surface treatment agent layer, the group that bonds to an organic material is preferably a polar group such as a hydroxyl group, an ether group, a glycidyl group, an acryl group, a methacryl group, a ureido group, an isocyanate group, a mercapto group, a carboxyl group, an amino group, a phosphoric acid group, and a phosphate group.

The electrolyte layer 14 is formed on the surface treatment agent layer 13. Specifically, the electrolyte layer 14 is formed so that it is in contact with a surface of the surface treatment agent layer 13. The electrolyte layer 14 includes a conductive polymer layer and an ionic liquid. When the electrolyte layer 14 is formed, a conductive polymer layer is first formed and then the conductive polymer layer is impregnated with an ionic liquid. Note that the conductive polymer and the ionic liquid are not bonded to each other. Further, the ionic liquid is present at least in voids in the conductive polymer layer, in particular, voids present in the vicinity of the interface on the side of the surface treatment agent layer 13. Note that in some cases, the ionic liquid may also be referred to as an ionic liquid, a low-melting-point molten salt, or a room-temperature molten salt.

In the electrolytic capacitor according to this embodiment, the surface treatment agent layer 13 is provided between the dielectric oxide film layer 12 and the electrolyte layer 14 (the conductive polymer layer). The surface treatment agent layer 13 and the ionic liquid have a property of attracting each other by an intermolecular force or an electrostatic force. Therefore, since the ionic liquid can reach the surface of the surface treatment agent layer 13, it is possible to fill voids present in the interface between the conductive polymer layer and the surface treatment agent layer 13, in particular, voids present in the vicinity of the interface of the conductive polymer layer on the side of the surface treatment agent layer 13 with the ionic liquid.

For example, at least one substance selected from a group consisting of pyrrole, thiophene, aniline, and derivatives thereof can be used as the monomer that provides a conductive polymer. Preferable examples of dopants that are used to obtain the conductive polymer by chemical oxidative polymerization or electrolytic polymerization of the aforementioned monomer include sulfonic-acid-based compounds such as benzenesulfonic acid, naphthalenesulfonic acid, phenolsulfonic acid, styrenesulfonic acid, and derivatives thereof. The molecular weight of the dopant is not limited to any particular value and can be selected as appropriate.

The type of the ionic liquid used in this embodiment is not limited to any particular type. However, it is preferable to use an ionic liquid that exhibits conductivity over a wide temperature range in which the electrolytic capacitor is used (e.g., $-60°$ C. to $200°$ C.). In particular, the ionic liquid is preferably a room-temperature ionic liquid that is in a liquid state at a room temperature under a normal pressure. The ionic liquid is particularly preferably a liquid that is in a melted state even at a sub-zero temperature.

Further, the electrolytic capacitor may be exposed to heat of 240 to $270°$ C. in a reflow furnace when it is mounted on a circuit board. Therefore, the decomposition temperature of the ionic liquid is preferably $250°$ C. or higher, particularly preferably $300°$ C. or higher so that it can withstand the aforementioned temperature. Further, there are hydrophilic ionic liquids and hydrophobic ionic liquid. However, it is preferable to use a hydrophobic ionic liquid because it is possible to prevent the ionic liquid from flowing out under a high temperature/high humidity environment.

Examples of cations and anions of the ionic liquid used in the present disclosure are shown below. The ionic liquid is a salt composed of a cation and an anion and having a melting point of $100°$ C. or lower. The ionic liquid can be selected by appropriately combining a cation and an anion shown below. The below-shown cations and anions are merely examples of materials used to form the ionic liquid. That is, the ionic liquid may be formed by using materials other than the below-shown cations and anions. Further, the only requirement in the present disclosure is that at least one type of an ionic liquid should be used. That is, there is no problem even if two or more types of ionic liquids are used together.

Examples of the cation of the ionic liquid include imidazolium derivatives, pyrrolidinium derivatives, piperidinium derivatives, pyridinium derivatives, morpholinium derivatives, ammonium derivatives, phosphonium derivatives, sulfonium derivatives, etc.

Examples of the imidazolium derivatives include 1-allyl-3-methylimidazolium, 1-benzyl-3-methylimidazolium, 1,3-bis(cyanomethyl)imidazolium, 1,3-bis(cyanopropyl)imidazolium, 1-butyl-2,3-dimethylimidazolium, 1-butyl-3-methylimidazolium, 1-butyl-3-dodecylimidazolium, 1-butyl-2,3-dimethylimidazolium, 1-(3-cyanopropyl)-3-methylimidazolium, 1-decyl-3-methylimidazolium, 1,3-diethoxyimidazolium, 1,3-dihydroxyimidazolium, 1,3-dihydroxy-2-methylimidazolium, 1,3-dimethoxyimidazolium, 1,3-dimethoxy-2-methylimidazolium, 1,3-dimethylimidazolium, 1,2-dimethyl-3-propylimidazolium, 1-decyl-3-methylimidazolium, 1-dodecyl-3-methylimidazolium, 1-ethyl-2,3-dimethylimidazolium, 1-ethyl-3-methylimidazolium, 1-hexyl-3-methylimidazolium, 1-hexyl-2,3-dimethylimidazolium, 1-(2-hydroxyethyl)-3-methylimidazolium, 1-(2,3-dihydroxypropyl)-3-methylimidazolium, 1-methylimidazolium, 1-methyl-3-octylimidazolium, 1-methyl-3-propylimidazolium, 1-propyl-3-methylimidazolium, 1-propyl-2,3-dimethylimidazolium, 1,2,3-trimethylimidazolium, 1-vinyl-3H-imidazolium, 1-ethyl-3-vinylimidazolium, 1-butyl-3-vinylimidazolium, 1-(2-methyl-18-crown-6)-3-methylimidazolium, etc.

Examples of the pyrrolidinium derivatives include 1-butyl-1-methylpyrrolidinium, 1-ethyl-1-methylpyrrolidinium, 1-propyl-1-methylpyrrolidinium, 1-allyl-1-methylpyrrolidinium, 1-(2-methoxyethyl)-1-methylpyrrolidinium, 1-(3-methoxypropyl)-1-methylpyrrolidinium, etc.

Examples of the piperidinium derivative include 1-propyl-1-methylpiperidinium, 1-butyl-1-methylpiperidinium, etc.

Examples of the pyridinium derivatives include 1-butyl-3-methylpyridinium, 1-butyl-4-methylpyridinium, 1-butylpyridinium, 1-(3-cyanopropyl)pyridinium, 1-ethyl-3-methylpyridinium, 1-ethylpyridinium, 1-propyl-3-methylpyridinium, 1-propylmethylpyridinium, 1-octylpyridinium, 1-hexylpyridinium, etc.

Examples of the morpholinium derivatives include 4-ethyl-4-methylmorpholinium, 4-(2-ethoxyethyl)-4-methylmorpholinium, etc.

Examples of the ammonium derivatives include butyltrimethyl ammonium, propyltrimethyl ammonium, pentyltrimethyl ammonium, cyclohexyltrimethyl ammonium, octyltrimethyl ammonium, ethyldimethylpropyl ammonium, 2-hydroxyethyl-trimethylammonium, methyltrioctyl ammonium, tetrabutyl ammonium, tetraethyl ammonium, tetrapropyl ammonium, tetrapentyl ammonium, tetraheptyl ammonium, tetrahexyl ammonium, tetraoctyl ammonium, tributylmethyl ammonium, triethylmethyl ammonium, tris (2-hydroxyethyl)methylammonium, 2-hydroxyethyl-trimethyl ammonium (also called choline), N-ethyl-N-(2-methoxyethyl)-N,N-dimethylammonium, N-ethyl-N-(3-methoxypropyl)-N,N-dimethylammonium, N,N-diethyl-N-(2-methoxyethyl)-N-methylammonium, 2-hydroxy-3-methacryloyl oxypropyltrimethyl ammonium, (2-acryloyloxyethyl)trimethylammonium, (2-methacryloyloxyethyl)trimethylammonium, N-oleyl-N,N-di(2-hydroxyethyl)-N-methylammonium, etc.

Examples of the phosphonium derivatives include tetrabutyl phosphonium, tetraoctyl phosphonium, tributylmethyl phosphonium, tributylhexadecyl phosphonium, tributyloctyl phosphonium, tributyldodecyl phosphonium, tributyl(2-methoxyethyl)phosphonium, triethylmethyl phosphonium, trihexyltetradecyl phosphonium, etc.

Examples of the sulfonium derivatives include triethylsulfonium, tributylsulfonium, trimethylsulfonium, etc.

Examples of the anion of the ionic liquid include chlorine, bromine, iodine, acetic acid, decanoic acid, sulfuric acid, lactic acid, nitric acid, benzoic acid, hydrooxide, methylsulfuric acid, methanesulfonic acid, ethanesulfonic acid, octanesulfonic acid, allylsulfonic acid, 1,1,2,2-tetrafluoro ethanesulfonic acid, nonafluoro butanesulfonic acid, trifluoro methanesulfonic acid, p-toluenesulfonic acid, aminoacetic acid, trifluoroacetic acid, 2-hydroxy-2-phenylacetic acid, 2-aminopropanoic acid, thiosalicylic acid, thiocyanic acid, dicyanamide, dimethylphosphonic acid, diethylphosphonic acid, dibutylphosphonic acid, bis(2,4,4-trimethylpentyl)phosphonic acid, hexafluorophosphoric acid, tetrafluoroboric acid, hexafluoroantimonic acid, tetrachloroalminic acid, tetrachloro ferrate(III), tris(trifluoromethylsulfonyl)methane, bis(fluorosulfonyl)imide, bis (trifluoromethylsulfonyl)imide, bis(pentafluoroethylsulfonyl)imide, etc.

Among the aforementioned anions, an ionic liquid composed of bis(trifluoromethylsulfonyl)imide tends to have a low viscosity. Therefore, such an ionic liquid is particularly suitable for impregnating voids between the conductive polymer layer and the surface treatment agent layer 13. Further, an ionic liquid composed of bis(trifluoromethylsulfonyl)imide is also preferred for impregnating such voids in view of its strong hydrophobicity.

Note that some types of ionic liquids have a chemical conversion ability to anodize valve metals. However, in the present disclosure, the ionic liquid does not need to have the chemical conversion ability. That is, even if the ionic liquid does not have the chemical conversion ability, the advantageous effect of the present disclosure is not affected. Further, in the present disclosure, the surface treatment agent layer 13 is formed on the dielectric oxide film layer 12. Therefore, even if the ionic liquid has the chemical conversion ability, it does not affect the anodic oxidation of the valve metal or, even if it affects the anodic oxidation, the effect on the anodic oxidation is sufficiently small.

Further, in the electrolytic capacitor according to this embodiment, the electrolyte layer 14 may be formed by forming, after impregnating the conductive polymer layer with the ionic liquid, another conductive polymer layer (a second conductive polymer layer) containing no ionic liquid. The conductive polymer layer containing no ionic liquid can be formed in a manner similar to that for forming the conductive polymer layer including the ionic liquid (the first conductive polymer layer). That is, at least one type of substance selected from a group consisting of pyrrole, thiophene, aniline, and derivatives thereof can be used as the monomer that provides a conductive polymer. Preferable examples of dopants that are used to obtain the conductive polymer by chemical oxidative polymerization or electrolytic polymerization of the aforementioned monomer include sulfonic-acid-based compounds such as benzenesulfonic acid, naphthalenesulfonic acid, phenolsulfonic acid, styrenesulfonic acid, and derivatives thereof. The molecular weight of the dopant is not limited to any particular value and can be selected as appropriate.

The conductive polymer layer containing no ionic liquid (the second conductive polymer layer) may be formed by using a conductive polymer dispersion liquid or a solution typified by PEDOT-PSS.

The conductive polymer dispersion liquid or solution is a liquid in which conductive polymer particles are dispersed or a conductive polymer is completely dissolved. As a solvent for the dispersion liquid or solution, water, a mixed solvent containing water and an organic solvent soluble in water, an organic solvent soluble in water, etc. can be used. The conductive polymer used for the conductive polymer dispersion liquid or solution is obtained by polymerizing at least one type of substance selected from a group consisting of pyrrole, thiophene, aniline, and derivatives thereof. Examples of soluble conductive polymers include thiophene derivatives having a sulfo group in a side chain, polymers of pyrrole derivatives, polyaniline, etc.

Further, examples of dispersible conductive polymers include conductive polymers that are obtained by doping at least one type of substance selected from a group consisting of pyrrole, thiophene, aniline, and derivatives thereof with a poly acid such as polystyrene sulfonic acid, polyester sulfonic acid, and polyvinyl sulfonic acid. Polyethylene dioxythiophene PEDOT-PSS doped with polystyrene sulfonic acid is preferred because of its high conductivity and high heat resistance.

The method for coating or impregnation with the conductive polymer dispersion liquid or solution is not limited to any particular method. Removal of the solvent from the conductive polymer dispersion liquid or solution can be carried out by a drying process. The drying temperature is not limited to any particular temperature as long as it is within a temperature range in which the solvent can be removed. However, it is preferably lower than 260° C. so as not to impair the conductivity of the conductive polymer. The drying time is selected as appropriate depending on the drying temperature. However, it is not limited to any particular length as long as the conductivity of the conductive polymer is not impaired. The conductive polymer layer may be formed by repeating the coating and the drying of the conductive polymer dispersion liquid or solution a plurality of times.

As shown in FIG. 1, the graphite layer 15 is formed on the electrolyte layer 14. The graphite layer 15 can be formed by, for example, coating or impregnating the electrolyte layer 14 with a graphite paste containing graphite or carbon, a binder, and the like, and then removing the solvent.

The silver layer 16 is formed on the graphite layer 15. The silver layer 16 can be formed, for example, by coating or impregnating the graphite layer 15 with a silver paste and then removing the solvent.

The valve metal lead 18 is connected to the electrode 20. For example, the valve metal lead 18 is connected to the electrode 20 by welding. Further, the silver layer 16 is connected to the electrode 21 with the conductive adhesive 17 interposed therebetween. Further, the electrolytic capacitor 1 is covered with the packaging resin 19 except for parts of the two electrodes 20 and 21 which are exposed to the outside. For the packaging resin 19, for example, a thermosetting epoxy resin or a cured liquid resin can be used.

As described above, in the electrolytic capacitor according to this embodiment, voids present in the interface between the electrolyte layer 14 (the conductive polymer layer) and the surface treatment agent layer 13 (i.e., voids present in the vicinity of the interface of the conductive polymer layer on the side of the surface treatment agent layer 13) are filled with the ionic liquid. In other words, the voids present in the interface between the electrolyte layer 14 (the conductive polymer layer) and the surface treatment agent layer 13 are replaced with the ionic liquid. Therefore, since the voids present in the electrolyte layer 14 (the conductive polymer layer) can be reduced, it is possible to provide an electrolytic capacitor having a high capacitance appearance ratio.

Note that in the electrolytic capacitor according to this embodiment, the surface treatment agent layer 13 is provided between the dielectric oxide film layer 12 and the electrolyte layer 14 (the conductive polymer layer). The surface treatment agent layer 13 and the ionic liquid have a property of attracting each other by an intermolecular force or an electrostatic force. Therefore, it is possible to make the ionic liquid reach the surface of the surface treatment agent layer 13 by providing the surface treatment agent layer 13 between the dielectric oxide film layer 12 and the electrolyte layer 14 (the conductive polymer layer) and thereby to reliably fill voids present in the interface between the electrolyte layer 14 (the conductive polymer layer) and the surface treatment agent layer 13 (i.e., voids present in the vicinity of the interface of the conductive polymer layer on the side of the surface treatment agent layer 13) with the ionic liquid.

An electrolytic capacitor in related art has a structure in which a valve metal, a dielectric oxide film layer, and a conductive polymer layer (an electrolyte layer) are laminated. When the conductive polymer layer is formed on the dielectric oxide film layer, voids are formed in the interface between the dielectric oxide film layer and the conductive polymer layer. When voids are formed as described above, the contact area between the conductive polymer layer and the dielectric oxide film layer becomes smaller, thus causing a problem that the capacitance of the electrolytic capacitor decreases from its theoretical value and hence a capacitance appearance ratio per unit volume of the electrolytic capacitor decreases.

In particular, in the case of a conductive polymer layer formed by oxidation polymerization using an oxidizer, there are a large number of voids in the layer. Therefore, a large number of voids are formed even in the interface between the dielectric oxide film layer and the conductive polymer layer.

Further, it is conceivable to fill voids of the conductive polymer layer with an ionic liquid. However, many of the voids in the conductive polymer layer are present in the interface with the dielectric oxide film layer and hence it has been very difficult to fill such voids in the conductive polymer layer with an ionic liquid.

Therefore, in the electrolytic capacitor according to this embodiment, the surface treatment agent layer 13 is provided between the dielectric oxide film layer 12 and the electrolyte layer 14 (the conductive polymer layer). The surface treatment agent layer 13 and the ionic liquid have a property of attracting each other by an intermolecular force or an electrostatic force. Therefore, by providing the surface treatment agent layer 13 between the dielectric oxide film layer 12 and the electrolyte layer 14 (the conductive polymer layer), it is possible to make the ionic liquid reach the surface of the surface treatment agent layer 13. Consequently, it is possible to fill the voids present in the interface between the electrolyte layer 14 (the conductive polymer layer) and the surface treatment agent layer 13 with the ionic liquid. The ionic liquid has conductivity. Therefore, it is possible to increase the capacitance appearance ratio of the electrolytic capacitor by filling the voids present in the interface between the electrolyte layer 14 (the conductive polymer layer) and the surface treatment agent layer 13 with the ionic liquid.

Note that in the electrolytic capacitor according to this embodiment, the only requirement is that at least some of the voids should be filled with the ionic liquid. That is, it is unnecessary to fill all of the voids inside the electrolyte layer 14 (the conductive polymer layer) with the ionic liquid. That is, there may be a part of the conductive polymer layer in which no ionic liquid is contained.

<Manufacturing Method 1 for Electrolytic Capacitor>

Next, a first manufacturing method (Manufacturing Method 1) for an electrolytic capacitor is described.

Figure 2:
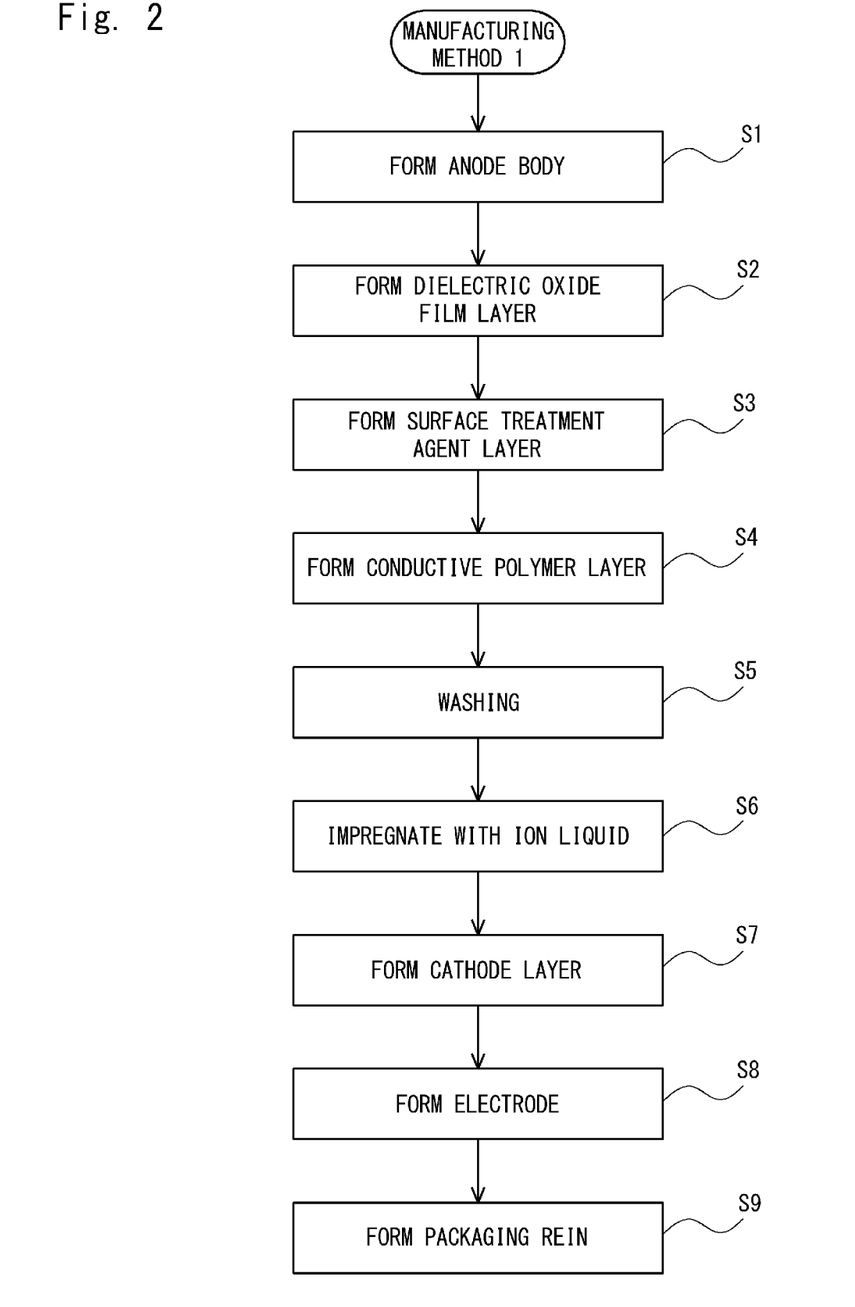
FIG. 2 is a flowchart for explaining a method for manufacturing (Manufacturing Method 1) for an electrolytic capacitor according to an embodiment.

FIG. 2 is a flowchart for explaining a method for manufacturing an electrolytic capacitor (Manufacturing Method 1) according to this embodiment. The method for manufacturing an electrolytic capacitor shown in FIG. 2 is described hereinafter with reference to the cross section shown in FIG. 1.

As shown in FIG. 2, firstly, an anode body is formed (step S1). For the anode body, a valve metal 11 can be used. As the valve metal 11, for example, at least one type of metal selected from aluminum, tantalum, niobium, tungsten, titanium or zirconium, or an alloy of these valve metals can be used.

Next, by anodizing the valve metal 11, a dielectric oxide film layer 12 is formed on a surface of the valve metal 11

(step S2). After that, a surface treatment agent layer 13 is formed on the dielectric oxide film layer 12 by using a surface treatment agent (step S3).

The surface treatment agent layer 13 can be formed by using a silane coupling agent, a titanate coupling agent, a phosphonic acid derivative, or the like. For the formation of the surface treatment agent layer 13, for example, it is possible to uniformly form a thin surface treatment agent layer 13 on the dielectric oxide film layer 12 by impregnating the valve metal 11, on which the dielectric oxide film layer 12 has been formed, with a solution obtained by diluting a surface treatment agent, and then drying/heating the valve metal 11 impregnated with the solution.

As the silane coupling agent, for example, the following substances available from Shin-Etsu Chemical Co., Ltd. can be used (those in parentheses are product names).

Vinyltrimethoxysilane "KBM-1003", vinyltriethoxysilane "KBE-1003", 2-(3,4-epoxycyclohexyl)ethyltrimethoxysilane "KBM-303", 3-glycidoxypropylmethyl dimethoxysilane "KBM-402", 3-glycidoxypropyl trimethoxysilane, "KBM-403", 3-glycidoxypropylmethyl diethoxysilane "KBE-402", 3-glycidoxypropyl triethoxysilane "KBE-403", p-styryltrimethoxysilane "KBM-1403", 3-methacryloxypropylmethyl dimethoxysilane "KBM-502", 3-methacryloxypropyl trimethoxysilane "KBM-503", 3-methacryloxypropylmethyl diethoxysilane "KBE-502", 3-methacryloxypropyl triethoxysilane "KBE-503", 3-acryloxypropyl trimethoxysilane "KBM-5103", N-2-(aminoethyl)-3-aminopropylmethyl dimethoxysilane "KBM-602", N-2-(aminoethyl)-3-aminopropyl trimethoxysilane "KBM-603", 3-aminopropyl trimethoxysilane "KBM-903", 3-aminopropyl triethoxysilane "KBE-903", 3-triethoxy silyl-N-(1, 3-dimethyl-butylidene)propylamine "KBE-9103", N-phenl-3-aminopropyl triethoxysilane "KBM-573", N-(vinylbenzyl)-2-aminoethyl-3-aminopropyl trimethoxysilane hydrochloride "KBM-575", tris(trimethoxysilylpropyl) isocyanurate "KBM-9659", 3-ureidopropyl trialkoxysilane "KBM-585", 3-mercaptopropylmethyl dimethoxysilane "KBM-802", 3-mercaptopropyl trimethoxysilane "KBM-803", and 3-isocyanate propyltriethoxysilane "KBE-9007".

As the titanate coupling agent, for example, the following substances (product names) available from Ajinomoto Fine-Techno Co., Inc. can be used.

"Plenact TTS", "Plenact 46B", "Plenact 55", "Plenact 41B", "Plenact 38S", "Plenact 138S", "Plenact 238S", "Plenact 338X", "Plenact 44", "Plenact 9SA", and "Plenact ET".

As the phosphonic acid derivative, for example, the following substances (product names) manufactured by Dojindo Laboratories can be used.

"10-CDPA", "11-AUPA", "11-HUPA", "FHPA", "FDPA", "M-EG$_3$-UPA", and "ODPA".

The silane coupling agent, the titanate coupling agent, and the phosphonic acid derivative are particularly preferred since they chemically bond with the dielectric oxide film layer 12 and hence become stable layers. However, a surface treatment agent layer 13 composed of a polymer film may be formed by impregnating the valve metal 11 on which the dielectric oxide film layer 12 has been formed with a polymer solution, and then drying/heating the valve metal 11 impregnated with the polymer solution. Examples of the polymer that can be suitably used for the above-described process include polystyrene sulfonic acid having a polar group, polyester sulfonic acid, polymaleic acid, polyvinyl alcohol, etc. That is, the surface treatment agent layer 13 preferably has a polar group in a molecular chain on the side of the electrolyte layer 14. As the polymer, a copolymer may be used.

After that, a conductive polymer layer is formed on the surface treatment agent layer 13 (step S4). Specifically, a conductive polymer layer is formed on the surface treatment agent layer 13 by making an oxidizer react with a monomer that is used for forming the conductive polymer on the surface treatment agent layer 13.

For example, at least one type of substance selected from a group consisting of pyrrole, thiophene, aniline, and derivatives thereof can be used as the monomer that provides a conductive polymer. Preferable examples of dopants that are used to obtain the conductive polymer by chemical oxidative polymerization or electrolytic polymerization of the aforementioned monomer include sulfonic-acid-based compounds such as benzenesulfonic acid, naphthalenesulfonic acid, phenolsulfonic acid, styrenesulfonic acid, and derivatives thereof. The molecular weight of the dopant is not limited to any particular value and can be selected as appropriate.

The conductive polymer layer may be formed by performing chemical oxidative polymerization of the monomer that provides a conductive polymer a plurality of times.

Note that impurities such as unreacted monomers, partially-reacted oligomers, and residues of the oxidizer are contained in the conductive polymer layer. If these impurities remain in the conductive polymer layer, the conductivity of the conductive polymer deteriorates with time. Therefore, these impurities are removed by washing (step S5). When the impurities are removed from the conductive polymer layer by the washing, voids are formed in places where the impurities were originally present.

After that, the conductive polymer layer is impregnated with an ionic liquid (step S6). As a result, the voids in the conductive polymer layer are filled with the ionic liquid. The ionic liquid used in the above-described process may be a pure ionic liquid or may be one that is obtained by diluting an ionic liquid with a solvent. Depending on the type, an ionic liquid may be highly viscous. Therefore, for such an ionic liquid, it is necessary to use a solvent to improve its impregnating property. A vacuum impregnation method, a vacuum pressurized impregnation method, or the like may be used to improve the impregnating property. Because a vapor pressure of an ionic liquid is extremely close to zero, it does not volatilize even in a vacuum state. Therefore, the vacuum impregnation method or the vacuum pressurized impregnation method can be efficiently performed. Note that since specific examples of the ionic liquid to be used have already been mentioned above, their explanations are omitted here.

After impregnating the conductive polymer layer with the ionic liquid, cathode layers (a graphite layer 15 and a silver layer 16) are formed (step S7). Specifically, a graphite layer 15 is formed on the electrolyte layer 14 and then a silver layer 16 is formed on the graphite layer 15.

Examples of the method for forming the graphite layer 15 include a method in which the electrolyte layer 14 is coated or impregnated with a graphite paste containing graphite or carbon, a binder, and the like, and then a solvent is removed. The removal of the solvent from the graphite paste can be carried out by a drying process. The drying temperature is not limited to any particular temperature as long as it is within a temperature range in which the solvent can be removed. However, it is preferably lower than 260° C. so as not to impair the conductivity of the conductive polymer. The drying time is selected as appropriate depending on the drying temperature. However, it is also not limited to any particular length as long as the conductivity of the conductive polymer is not impaired.

Examples of methods for forming the silver layer 16 include a method in which the graphite layer 15 is coated or impregnated with a silver paste and then a solvent is removed. The removal of the solvent from the silver paste can be carried out by a drying process. The drying temperature is not limited to any particular temperature as long as it is within a temperature range in which the solvent can be removed. However, it is preferably lower than 260° C. so as not to impair the conductivity of the conductive polymer. The drying time is selected as appropriate depending on the drying temperature. However, it is also not limited to any particular length as long as the conductivity of the conductive polymer is not impaired.

After that, the electrodes 20 and 21 are formed (step S8). Specifically, the electrode 20 is connected to the valve metal lead 18 by welding. Further, the electrode 21 is connected to the silver layer 16 by using a conductive adhesive 17. Examples of methods for forming the conductive adhesive 17 include a method in which the silver layer 16 is coated with the above-described conductive adhesive paste, and then after the electrode 21 is placed over the conductive adhesive paste, a solvent is removed. The removal of the solvent from the conductive adhesive paste can be carried out by a drying process. The drying temperature is not limited to any particular temperature as long as it is within a temperature range in which the solvent can be removed. However, it is preferably lower than 260° C. so as not to impair the conductivity of the conductive polymer. The drying time is selected as appropriate depending on the drying temperature. However, it is also not limited to any particular length as long as the conductivity of the conductive polymer is not impaired.

After that, a packaging resin 19 is formed (step S9). Note that the packaging resin 19 is formed so that parts of the two electrodes 20 and 21 are exposed to the outside. The resin used for the packaging resin 19 is not limited to any particular resin. For example, a thermosetting epoxy resin or a method for curing a liquid resin can be used.

By using the above-described manufacturing method, it is possible to form an electrolytic capacitor in which voids present in the interface between the electrolyte layer 14 (the conductive polymer layer) and the surface treatment agent layer are filled with an ionic liquid. Therefore, it is possible to provide a method for manufacturing an electrolytic capacitor having a high capacitance appearance ratio.

<Manufacturing Method 2 for Electrolytic Capacitor>

Next, a second manufacturing method (Manufacturing Method 2) for an electrolytic capacitor is described.

Figure 3:
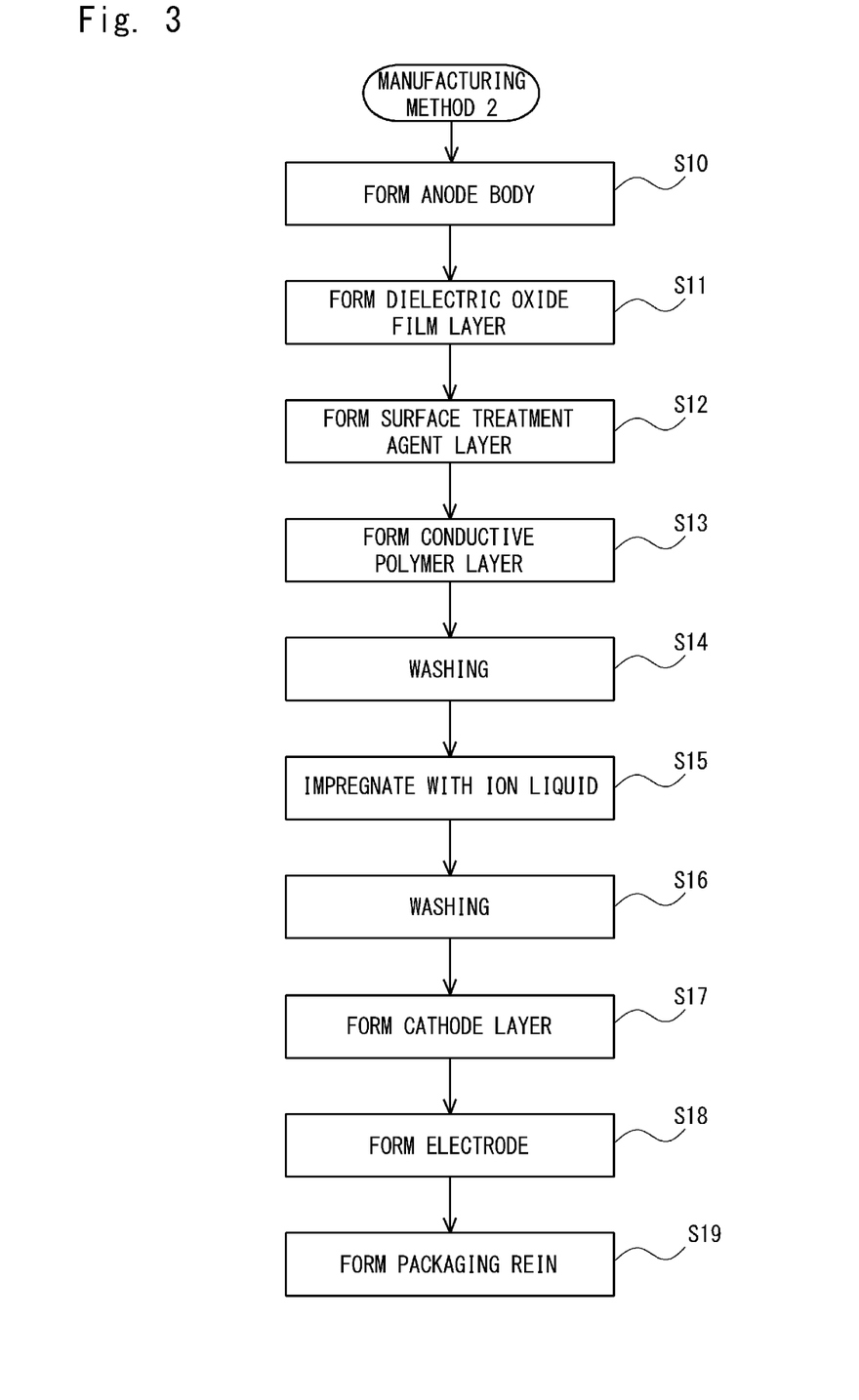
FIG. 3 is a flowchart for explaining a method for manufacturing (Manufacturing Method 2) for an electrolytic capacitor according to an embodiment.

FIG. 3 is a flowchart for explaining a method for manufacturing an electrolytic capacitor (Manufacturing Method 2) according to this embodiment. The Manufacturing Method 2 shown in FIG. 3 differs from the Manufacturing Method 1 shown in FIG. 2 because the Manufacturing Method 2 includes a washing process in a step S16. The other processes in the manufacturing method are similar to those in the Manufacturing Method 1 shown in FIG. 2 and hence duplicate explanations are omitted. That is, steps S10 to S15 in the Manufacturing Method 2 shown in FIG. 3 are similar to the steps S1 to S6 in the Manufacturing Method 1 shown in FIG. 2. Further, steps S17 to S19 in the Manufacturing Method 2 shown in FIG. 3 are similar to the steps S7 to S9 in the Manufacturing Method 1 shown in FIG. 2.

In a step S15 in FIG. 3, there are cases where when the conductive polymer layer of the electrolyte layer 14 is impregnated with the ionic liquid, some of the ionic liquid could remain in a layered state on the conductive polymer layer. When some of the ionic liquid remains in a layered state as described above, the layered ionic liquid is present between the electrolyte layer 14 (the conductive polymer layer) and the graphite layer 15 (the cathode layer). Note that conductivity of ionic liquids, which exhibit ionic conductivity, is lower than that of conductive polymers, graphite, and the like. Therefore, there is a problem that if the layered ionic liquid is present between the electrolyte layer 14 (the conductive polymer layer) and the graphite layer 15 (the cathode layer), an initial ESR of the capacitor becomes higher. Further, if an ionic liquid, which is in a liquid state, is formed (i.e., present) in a layered state, a bonding force between materials located on both sides thereof (i.e., a bonding force between the electrolyte layer 14 and the graphite layer 15) is weakened, thus possibly deteriorating capacitor characteristics with time.

To solve the above-described problem, in the Manufacturing Method 2 shown in FIG. 3, after the conductive polymer layer is impregnated with the ionic liquid, the ionic liquid remaining on the electrolyte layer 14 is removed by carrying out the washing process in the step S16.

The washing solvent used in the washing process is not limited to any particular solvent as long as it can dissolve and thereby remove the ionic liquid. After the washing, a step of volatilizing the washing solvent so that the washing solvent does not remain may be performed. Further, another washing process may be carried out by using another washing solvent. The washing time is dependent on a frequency of stirring during the washing process, a frequency of replacement of the washing solvent, a size of a capacitor element to be manufactured, and so on. Therefore, the washing time can be changed as appropriate.

Note that there is a concern that when the washing process is carried out after the conductive polymer layer is impregnated with the ionic liquid, the ionic liquid contained in the voids of the conductive polymer layer may be eluted (i.e., may flow out). However, in this embodiment, the surface treatment agent layer 13 is formed between the dielectric oxide film layer 12 and the electrolyte layer 14. The surface treatment agent layer 13 and the ionic liquid have a property of attracting each other by an intermolecular force or an electrostatic force. Therefore, by providing the surface treatment agent layer 13, it is possible to prevent the ionic liquid contained in the voids of the conductive polymer layer from being eluted (i.e., from flowing out) by the washing process.

Accordingly, by moderately performing the washing after the conductive polymer layer is impregnated with the ionic liquid, it is possible to remove the remaining excessive ionic liquid while maintaining the ionic liquid contained in the voids of the conductive polymer layer.

As described above, by using the method for manufacturing an electrolytic capacitor (Manufacturing Method 2) shown in FIG. 3, it is possible to form an electrolytic capacitor in which the ionic liquid is removed in the interface where the electrolyte layer 14 (the conductive polymer layer) is in contact with the cathode layer (the graphite layer 15). Therefore, it is possible to prevent the initial ESR value of the capacitor from becoming larger. Further, it is possible to prevent capacitor characteristics from deteriorating with time. Note that the remaining ionic liquid does not need to be completely removed. That is, some of the ionic liquid may remain in a part of the interface where the electrolyte layer 14 (the conductive polymer layer) is in contact with the cathode layer (the graphite layer 15).

<Manufacturing Method 3 for Electrolytic Capacitor>

Next, a third manufacturing method (Manufacturing Method 3) for an electrolytic capacitor is described.

Figure 4:
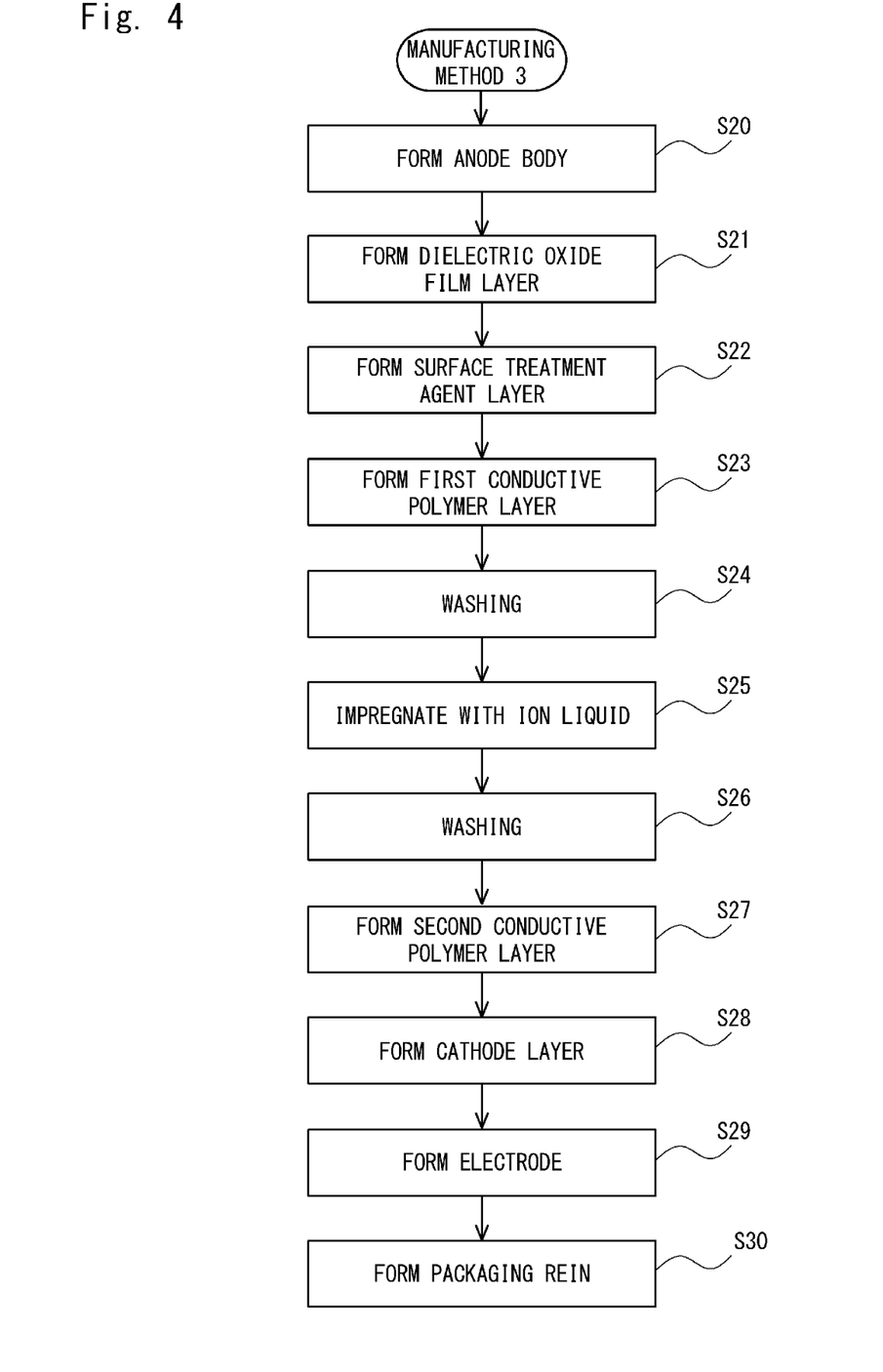
FIG. 4 is a flowchart for explaining a method for manufacturing (Manufacturing Method 3) for an electrolytic capacitor according to an embodiment.

FIG. 4 is a flowchart for explaining a method for manufacturing an electrolytic capacitor (Manufacturing Method 3) according to this embodiment. The Manufacturing Method 3 shown in FIG. 4 shows a method for manufacturing an electrolytic capacitor in which the electrolyte layer 14 includes two conductive polymer layers. Note that steps S20 to S25 in the Manufacturing Method 3 shown in FIG. 4 are similar to the steps S1 to S6 in the Manufacturing Method 1 shown in FIG. 2. Further, steps S28 to S30 in the Manufacturing Method 3 shown in FIG. 4 are similar to the steps S7 to S9 of the Manufacturing Method 1 shown in FIG. 2. Therefore, duplicate descriptions of them are omitted.

As shown in FIG. 4, after the conductive polymer layer is impregnated with the ionic liquid in the step S25, a washing process is carried out and thereby the ionic liquid remaining on the conductive polymer layer is removed in a step S26. Note that the washing process in the step S26 is similar to that in the step S16 in the Manufacturing Method 2 shown in FIG. 3, and therefore duplicate explanations are omitted.

In the Manufacturing Method 3 shown in FIG. 4, after the washing process (step S26), a second conductive polymer layer containing no ionic liquid is also formed (step S27). Similarly to the first conductive polymer layer containing the ionic liquid, the second conductive polymer layer containing no ionic liquid may be formed by making an oxidizer react with a monomer for forming the conductive polymer, or may be formed by using a conductive polymer dispersion liquid or solution typified by PEDOT-PSS.

The subsequent steps S28 to S30 are similar to the steps S7 to S9 in the Manufacturing Method 1 shown in FIG. 2.

In the Manufacturing Method 3 shown in FIG. 4, the ionic liquid is also removed in the washing process (step S26) before the second conductive polymer layer is formed. Therefore, it is possible to form the electrolyte layer 14 in which the ionic liquid is removed in the interface where the first conductive polymer layer is contact with the second conductive polymer layer. Therefore, it is possible to prevent the initial ESR value of the capacitor from becoming larger. Further, it is possible to prevent capacitor characteristics from deteriorating with time.

EXAMPLES

Examples according to the present disclosure are described below. Note that a table in FIG. 5 shows manufacturing conditions and the like of examples and comparative examples described below.

Example 1

A sample of an Example 1 was manufactured by the Manufacturing Method 1 shown in FIG. 2.

Firstly, a capacitor element was formed by electrolytically oxidizing a sintered body of a tantalum fine powder, which was used as a valve metal, with a voltage of 40V in a phosphoric acid aqueous solution and thereby forming a dielectric oxide film layer on the entire surface of the sintered body of the tantalum fine powder.

After forming the dielectric oxide film layer, an anode part of the above-described capacitor element was submerged in a 40% sulfuric acid aqueous solution and a capacitance of the capacitor element was measured in the solution. The capacitance measured in the solution is the maximum value of the capacitance of the capacitor element. The capacitance of the capacitor element (an average of 100 capacitor elements) was 37.2 µF. After measuring the capacitance in the solution, sulfuric acid adhering to the capacitor element was removed by washing the capacitor element with a large amount of water. After the washing, the capacitor element was dried in a constant-temperature bath at 105° C. for 30 minutes.

After that, the above-described capacitor element was impregnated with a 1 wt % aqueous solution of 3-glycidoxypropyl trimethoxysilane ("KBM-403" manufactured by Shin-Etsu Chemical Co., Ltd., a group that bonds to an organic material: a glycidyl group), which was a silane coupling agent. Then, after taking out the capacitor element from the silane coupling agent solution, a surface treatment agent layer composed of the silane coupling agent was formed on a dielectric oxide film layer by performing a drying process and a reaction process at 125° C. for one hour, and thereby bonding the dielectric oxide film layer with the silane coupling agent.

Next, the capacitor element covered with the surface treatment agent layer was submerged in a 30 wt % iron(II) p-toluenesulfonate methanol solution, which was used as an oxidizer and a dopant, for 10 minutes and then dried at a room temperature for 30 minutes. After that, the capacitor element was submerged in 3,4-ethylenedioxythiophene of a thiophene derivative, which was a monomer that provides a conductive polymer, for 10 minutes. Then, the capacitor element was kept at a room temperature for 30 minutes and hence 3,4-ethylenedioxythiophene was polymerized. After that, unreacted substances and residues of the oxidizer were washed out by submerging the capacitor element in ethanol. A conductive polymer layer composed of polyethylene dioxythiophene (PEDOT) was formed on the surface treatment agent layer by repeating the above-described series of polymerization operations including the charging (i.e., the adding) of the oxidizer, and the charging and washing of 3,4-ethylenedioxythiophene 10 times.

After the conductive polymer layer was formed, the capacitor element was submerged in a 50 wt % ethanol solution of 1-ethyl-3-methylimidazolium bis(trifluoromethylsulfonyl)imide (EMI-TFSI), which was an ionic liquid, for 10 minutes, kept at a room temperature for 30 minutes, and then dried in a constant-temperature bath at 105° C. for 30 minutes. By doing so, ethanol, which was the solvent, was removed. Through these processes, a conductive polymer layer and an electrolyte layer composed of 1-ethyl-3-methylimidazolium bis(trifluoromethylsulfonyl)imide, which was the ionic liquid, were formed. Note that it was confirmed that the voids were filled with the ionic liquid by using TEM-EDS (Transmission Electron Microscope-Energy Dispersive X-ray Spectroscopy), Current-AFM (Atomic Force Microscope), etc.

After the electrolyte layer was formed, a pellet(s) was submerged in the graphite paste, pulled up therefrom, and then dried at 120° C. for one hour. By doing so, a graphite layer is formed on the pellet. After the graphite layer was formed, the pellet was submerged in a silver paste, pulled up therefrom, and then dried at 120° C. for one hour. By doing so, a silver layer is formed on the pellet (i.e., on the graphite layer). Next, valve metal leads were welded and connected to the electrodes. Further, the silver layer was connected to the electrodes by using a conductive adhesive. After that, an electrolytic capacitor was manufactured by forming a packaging resin.

Further, the manufactured electrolytic capacitor was mounted on an evaluation circuit board by carrying out a reflow soldering process. Then, capacitor characteristics (i.e., a capacitance appearance ratio and an ESR) were evaluated. As the evaluation of the capacitance appearance ratio, a capacitance appearance ratio was calculated by using a capacitance C0 that was measured in a 40% sulfuric acid solution after a dielectric oxide film layer was formed by electrolytic oxidation, and a capacitance C1 that was measured after the electrolytic capacitor was mounted on the evaluation circuit board. That is, the capacitance appearance ratio (%) was obtained by using the below-shown formula.

Capacitance appearance ratio (%)=C1/C0×100

Further, a reliability test of the manufactured electrolytic capacitor was carried out by placing it undisturbed in a constant-temperature bath at 125° C. for 500 hours. The table in FIG. 5 shows initial ESRs (INIs) after the mounting and changing rates of ESRs (changing rates from the initial ESRs) after leaving the electrolytic capacitor in the constant-temperature bath at 125° C. for 500 hours.

As shown in FIG. 5, in the Example 1, the capacitance appearance ratio was 95% and the ESR (INI) was 62 mΩ. Further, the changing rate of the ESR was 2.0 times.

Example 2

A capacitor element was manufactured in a manner similar to that for the Example 1, except that when the surface treatment agent layer was formed, an 1 wt % solution of 3-aminopropyl trimethoxysilane ("KBM-903" manufactured by Shin-Etsu Chemical Co., Ltd., a group that bonds to an organic material: an amino group) was used as the silane coupling agent. As shown in FIG. 5, in the Example 2, the capacitance appearance ratio was 94% and the ESR (INI) was 64 mΩ. Further, the changing rate of the ESR was 1.9 times.

Example 3

A capacitor element was manufactured in a manner similar to that for the Example 1, except that when the surface treatment agent layer was formed, an 1 wt % solution of p-styryltrimethoxysilane ("KBM-1403" manufactured by Shin-Etsu Chemical Co., Ltd., a group that bonds to an organic material: a styryl group) was used as the silane coupling agent. As shown in FIG. 5, in the Example 3, the capacitance appearance ratio was 89% and the ESR (INI) was 65 mΩ. Further, the changing rate of the ESR was 2.0 times.

Example 4

A capacitor element was manufactured in a manner similar to that for the Example 1, except that a 50% aqueous solution of 1-ethyl-3-methylimidazolium ethylsulfonate (EMI-ES) was used as the ionic liquid. As shown in FIG. 5, in the Example 4, the capacitance appearance ratio was 93% and the ESR (INI) was 71 mΩ. Further, the changing rate of the ESR was 2.0 times.

Example 5

A capacitor element was manufactured in a manner similar to that for the Example 1, except that a 50% aqueous solution of 1-butyl-3-methylpyridinium trifluoromethanesulfonate (BMP-TFS) was used as the ionic liquid. As shown in FIG. 5, in the Example 5, the capacitance appearance ratio was 94% and the ESR (INI) was 70 mΩ. Further, the changing rate of the ESR was 1.9 times.

Example 6

A capacitor element was manufactured in a manner similar to that for the Example 1, except that when the surface treatment agent layer was formed, a titanate coupling agent (Ajinomoto Fine-Techno Co., Inc. "Plenact 44", a group that bonds to an organic material: an amino group) was used. As the titanate coupling agent "Plenact 44", a 1 wt % ethanol solution was used. A drying process for the titanate coupling agent "Plenact 44" was carried out for two hours at 85° C. under a pressure of $1 \times 10^3$ Pa by using a vacuum drier.

As shown in FIG. 5, in the Example 6, the capacitance appearance ratio was 95% and the ESR (INI) was 62 mΩ. Further, the changing rate of the ESR was 2.0 times.

Example 7

A capacitor element was manufactured in a manner similar to that for the Example 1, except that when the surface treatment agent layer was formed, a phosphonic acid derivative (Dojindo Laboratories "10-CDPA", a group that bonds to an organic material: a carboxyl group) was used. As the phosphonic acid derivative "10-CDPA", a 0.26 wt % ethanol solution was used. A drying process for the phosphonic acid derivative "10-CDPA" was carried out for 48 hours in a constant-temperature bath at 140° C.

As shown in FIG. 5, in the Example 7, the capacitance appearance ratio was 95% and the ESR (INI) was 61 mΩ. Further, the changing rate of the ESR was 2.0 times.

Example 8

A capacitor element was manufactured in a manner similar to that for the Example 1, except that when the surface treatment agent layer was formed, a phosphonic acid derivative (Dojindo Laboratories "ODPA", a group that bonds to an organic material: an alkyl group) was used. As the phosphonic acid derivative "ODPA", a 0.33 wt % ethanol solution was used. A drying process for the phosphonic acid derivative "ODPA" was carried out for 48 hours in a constant-temperature bath at 140° C.

As shown in FIG. 5, in the Example 8, the capacitance appearance ratio was 88% and the ESR (INI) was 65 mΩ. Further, the changing rate of the ESR was 2.1 times.

Example 9

In an Example 9, after the conductive polymer layer was impregnated with the ionic liquid, a layer of the ionic liquid remaining on the conductive polymer layer was removed by performing a wishing process before the graphite layer was formed. Except for this process, the Example 9 was similar to the Example 1. That is, in the Example 9, an electrolytic capacitor was manufactured by using the Manufacturing Method 2 shown in FIG. 3.

Specifically, after impregnating the capacitor element, in which the conductive polymer layer was already formed, with the ionic liquid, a layer of the ionic liquid deposited on the conductive polymer layer was removed by submerging the capacitor element impregnated with the ionic liquid in a large amount of ethanol for 30 minutes. After the capacitor element was washed by ethanol, the ethanol, which was the washing solvent, was removed by leaving the capacitor element undisturbed at a room temperature for 30 minutes and further drying it in a constant-temperature bath at 105° C. for 30 minutes. After that, similarly to the Example 1, an electrolytic capacitor was manufactured by forming a graphite layer and the like on the conductive polymer layer.

As shown in FIG. 5, in the Example 9, the capacitance appearance ratio was 95% and the ESR (INI) was 44 mΩ. Further, the changing rate of the ESR was 1.2 times.

Example 10

In an Example 10, after the conductive polymer layer was impregnated with the ionic liquid, a layer of the ionic liquid remaining on the conductive polymer layer was removed by performing a wishing process. After that, a second conductive polymer layer was formed on the conductive polymer layer (the first conductive polymer layer). Except for these processes, the Example 10 was similar to the Example 1. That is, in the Example 10, an electrolytic capacitor was manufactured by using the Manufacturing Method 3 shown in FIG. 4.

Specifically, similarly to the Example 9, after impregnating the capacitor element, in which the conductive polymer layer (the first conductive polymer layer) was already formed, with the ionic liquid, a layer of the ionic liquid deposited on the conductive polymer layer was removed by submerging the capacitor element impregnated with the ionic liquid in a large amount of ethanol for 30 minutes. After the capacitor element was washed by ethanol, the ethanol, which was the washing solvent, was removed by leaving the capacitor element undisturbed at a room temperature for 30 minutes and further drying it in a constant-temperature bath at 105° C. for 30 minutes.

After that, a second conductive polymer layer was formed on the conductive polymer layer (the first conductive polymer layer). For the formation of the second conductive polymer layer, a PEDOT-PSS dispersion liquid was used. The second conductive polymer layer was formed by submerging the capacitor element, in which the first conductive polymer layer containing the ionic liquid was already formed, in the PEDOT-PSS dispersion liquid, pulling up the capacitor element from the PEDOT-PSS dispersion liquid, and then drying the capacitor element. A drying process for the PEDOT-PSS dispersion liquid was carried out for one hour in a constant-temperature bath at 125° C. An electrolyte layer composed of the first conductive polymer layer containing the ionic liquid and the second conductive polymer layer containing no ionic liquid was formed by repeating the submersion into the PEDOT-PSS dispersion liquid and the drying process four times. After that, similarly to the Example 1, an electrolytic capacitor was manufactured by forming a graphite layer and the like on the conductive polymer layer.

As shown in FIG. 5, in the Example 10, the capacitance appearance ratio was 95% and the ESR (INI) was 47 mΩ. Further, the changing rate of the ESR was 1.2 times.

Next, Comparative Examples are Described.

Comparative Example 1

A Comparative Example 1 was similar to the Example 1, except that the surface treatment agent layer was not formed. As shown in FIG. 5, in the Comparative Example 1, the capacitance appearance ratio was 85% and the ESR (INI) was 63 mΩ. Further, the changing rate of the ESR was 2.0 times.

Comparative Example 2

A Comparative Example 2 is similar to the Comparative Example 1, except that 1-ethyl-3-methylimidazolium ethylsulfonate (EMI-ES) was used as the ionic liquid. As shown in FIG. 5, in the Comparative Example 2, the capacitance appearance ratio was 85% and the ESR (INI) was 73 mΩ. Further, the changing rate of the ESR was 2.0 times.

Comparative Example 3

A Comparative Example 3 is similar to the Comparative Example 1, except that 1-butyl-3-methylpyridinium trifluoromethanesulfonate (BMP-TFS) was used as the ionic liquid. As shown in FIG. 5, in the Comparative Example 3, the capacitance appearance ratio was 84% and the ESR (INI) was 73 mΩ. Further, the changing rate of ESR was 2.0 times.

Comparative Example 4

Figure 6:
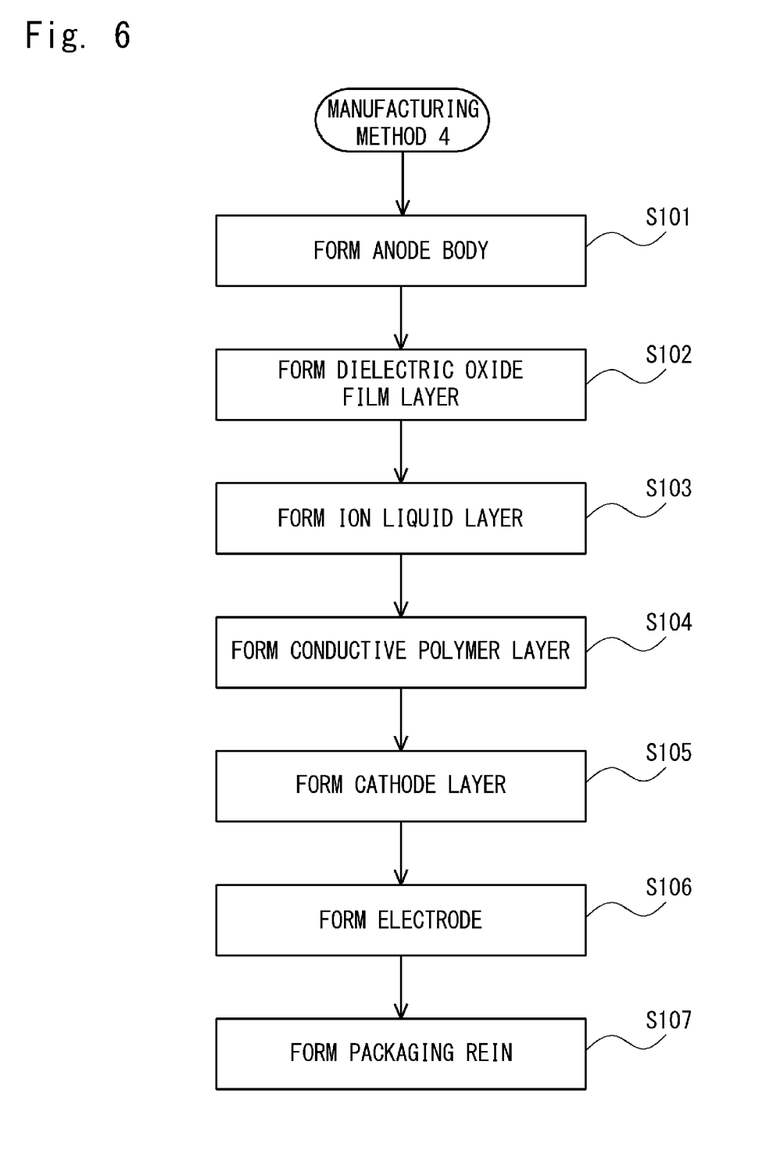
FIG. 6 is a flowchart for explaining a method for manufacturing (Manufacturing Method 4) for an electrolytic capacitor according to a comparative embodiment.

In a Comparative Example 4, an electrolytic capacitor was manufactured by using the Manufacturing Method 4 shown in FIG. 6. Firstly, a sintered body of a tantalum fine powder, which was used as a valve metal, was formed (step S101). After that, a capacitor element was formed by electrolytically oxidizing the sintered body of the tantalum fine powder with a voltage of 40V in a phosphoric acid aqueous solution and thereby forming a dielectric oxide film layer on the entire surface of the sintered body of the tantalum fine powder (step S102).

Then, an ionic liquid layer was formed by directly impregnating a dielectric oxide film layer with an ionic liquid (step S103). After the dielectric oxide film layer was formed, the capacitor element was submerged in a 50 wt % ethanol solution of 1-ethyl-3-methylimidazolium bis(trifluoromethylsulfonyl)imide (EMI-TFSI), which was an ionic liquid, for 10 minutes, kept at a room temperature for 30 minutes, and then dried in a constant-temperature bath at 105° C. for 30 minutes. By doing so, ethanol, which was the solvent, was removed. Through these processes, the ionic liquid layer which is directly in contact with the dielectric oxide film layer was formed.

Next, the capacitor element covered with the ionic liquid layer was submerged in a 30 wt % iron(II) p-toluenesulfonate methanol solution, which was used as an oxidizer and a dopant, for 10 minutes. After that, the capacitor element was dried at a room temperature for 30 minutes and then the capacitor element was submerged in 3,4-ethylenedioxythiophene of a thiophene derivative, which was a monomer that provides a conductive polymer, for 10 minutes. Further, the capacitor element was kept at a room temperature for 30 minutes and hence 3,4-ethylenedioxythiophene was polymerized. A conductive polymer layer composed of polyethylene dioxythiophene (PEDOT) was formed by repeating the above-described series of polymerization operations including the charging (i.e., the adding) of the oxidizer and the charging of 3,4-ethylenedioxythiophene five times (step S104).

In the Comparative Example 4, after the conductive polymer layer was formed, the washing was not carried out in order to prevent the ionic liquid layer from flowing out. The subsequent steps S105 to S107 are similar to those in the Example 1. As shown in FIG. 5, in the Comparative Example 4, the capacitance appearance ratio was 81% and the ESR (INI) was 97 mΩ. Further, the changing rate of the ESR was 4.7 times.

Comparative Example 5

A Comparative Example 5 is similar to the Comparative Example 4, except that washing was performed after the conductive polymer layer was formed in the step S104 in the Manufacturing Method 4 shown in FIG. 6. That is, after an ionic liquid layer which is directly in contact with the dielectric oxide film layer was formed, the capacitor element covered with this ionic liquid layer was submerged in a 30 wt % iron(II) p-toluenesulfonate methanol solution, which was used as an oxidizer and a dopant, for 10 minutes. After that, the capacitor element was dried at a room temperature for 30 minutes and then the capacitor element was submerged in 3,4-ethylenedioxythiophene of a thiophene derivative, which was a monomer that provides a conductive polymer, for 10 minutes. Further, the capacitor element was kept at a room temperature for 30 minutes and hence 3,4-ethylenedioxythiophene was polymerized.

After that, unreacted substances and residues of the oxidizer were washed out by submerging the capacitor element in ethanol. A conductive polymer layer composed of polyethylene dioxythiophene (PEDOT) was formed by repeating the above-described series of polymerization operations including the charging (i.e., the adding) of the oxidizer, and the charging and washing of 3,4-ethylenedioxythiophene five times. The subsequent processes are similar to those in the Comparative Example 4. As shown in FIG. 5, in the Comparative Example 5, the capacitance appearance ratio was 78% and the ESR (INI) was 55 mΩ. Further, the changing rate of the ESR was 1.3 times.

Comparative Example 6

Figure 7:
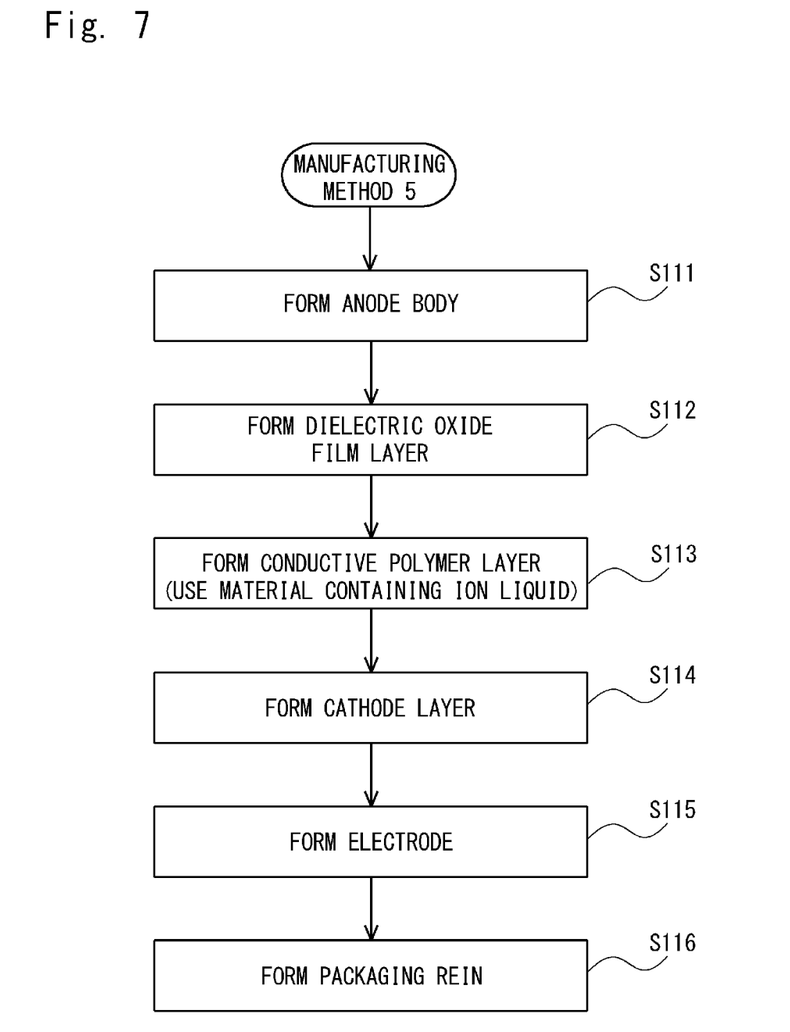
FIG. 7 is a flowchart for explaining a method for manufacturing (Manufacturing Method 5) for an electrolytic capacitor according to a comparative embodiment.

In a Comparative Example 6, an electrolytic capacitor was manufactured by using the Manufacturing Method 5 shown in FIG. 7. Firstly, a sintered body of a tantalum fine powder, which was used as a valve metal, was formed (step S111). After that, a capacitor element was formed by electrolytically oxidizing the sintered body of the tantalum fine powder with a voltage of 40V in a phosphoric acid aqueous solution and thereby forming a dielectric oxide film layer on the entire surface of the sintered body of the tantalum fine powder (step S112).

Then, the capacitor element, in which the dielectric oxide film layer was already formed, was submerged in a methanol solution containing a mixture of 10 wt % of 1-ethyl-3-methylimidazolium bis(trifluoromethylsulfonyl)imide, which was an ionic liquid, 10 wt % of iron(II) p-toluenesulfonate, which was used as an oxidizer and a dopant, and 30 wt % of 3,4-ethylenedioxythiophene, which was a monomer that provides a conductive polymer, for 10 minutes. Then, the capacitor element was kept at a room temperature for 30 minutes and hence 3,4-ethylenedioxythiophene was polymerized. A conductive polymer layer composed of polyethylene dioxythiophene (PEDOT) was formed by repeating the above-described polymerization operation five times (step S113).

In the Comparative Example 6, the conductive polymer layer was formed on the dielectric oxide film layer by using a mixed solution in which the ionic liquid, the oxidizer and the dopant, and the monomer that provides a conductive polymer were dissolved. In order to prevent the ionic liquid layer from flowing out, the washing was not carried out after the conductive polymer layer was formed. The subsequent steps S114 to S116 are similar to those in in the Example 1. As shown in FIG. 5, in the Comparative Example 6, the capacitance appearance ratio was 76% and the ESR (INI) was 120 mΩ. Further, the changing rate of the ESR was 5.1 times.

Comparative Example 7

A Comparative Example 7 is similar to the Comparative Example 6, except that washing was performed after the conductive polymer layer was formed in the step S113 in the Manufacturing Method 5 shown in FIG. 7. That is, the capacitor element, in which the dielectric oxide film layer was already formed, was submerged in a methanol solution containing a mixture of 10 wt % of 1-ethyl-3-methylimidazolium bis(trifluoromethylsulfonyl)imide, which was an ionic liquid, 10 wt % of iron(II) p-toluenesulfonate, which was used as an oxidizer and a dopant, and 30 wt % of 3,4-ethylenedioxythiophene, which was a monomer that provides a conductive polymer, for 10 minutes. Then, the capacitor element was kept at a room temperature for 30 minutes and hence 3,4-ethylenedioxythiophene was polymerized.

After that, unreacted substances and residues of the oxidizer were washed out by submerging the capacitor element in ethanol. A conductive polymer layer composed of polyethylene dioxythiophene (PEDOT) was formed by repeating the above-described series of polymerization operations five times. The subsequent processes are similar to those in the Comparative Example 6. As shown in FIG. 5, in the Comparative Example 7, the capacitance appearance ratio was 73% and the ESR (INI) was 78 mΩ. Further, the changing rate of the ESR was 1.7 times.

<Examination on Results>

When the Examples 1 to 10 are compared with the Comparative Examples 1 to 7, the capacitance appearance ratios in the Examples 1 to 10 are entirely higher than those in the Comparative Examples 1 to 7. Therefore, it was possible to improve the capacitance appearance ratio by filling voids between the conductive polymer layer and the surface treatment agent layer with the ionic liquid. In particular, when the Example 1 is compared with the Comparative Example 1, while the capacitance appearance ratio was 95% in the Example 1, in which the surface treatment agent layer was provided, it was 85% in the Comparative Example 1, in which the surface treatment agent layer was not provided. Based on this result, it has been confirmed that it is possible to make the ionic liquid reach the surface of the surface treatment agent layer by providing the surface treatment agent layer between the dielectric oxide film layer and the conductive polymer layer, and thereby to reliably fill the voids between the conductive polymer layer and the surface treatment agent layer with the ionic liquid.

Further, when the Example 1 is compared with the Example 9, while the initial value of the ESR in the Example 1 was 62 mΩ, it was 44 mΩ, i.e., lower in the Example 9. Further, regarding the changing rate of the ESR, while the changing rate of the ESR in the Example 1 was 2.0, it was 1.2, i.e., lower in the Example 9. It is concealable that these differences were caused because the excessive ionic liquid remaining on the conductive polymer layer was removed after the capacitor element was impregnated with the ionic liquid in the Example 9. Therefore, it was possible to improve the ESR of the capacitor by removing the remaining excessive ionic liquid after the capacitor element was impregnated with the ionic liquid. The Example 10 showed similar results.

Further, in the Comparative Examples 4 and 5, as shown in the Manufacturing Method 4 shown in FIG. 6, the ionic liquid layer was formed by directly impregnating the dielectric oxide film layer with the ionic liquid, and then a conductive polymer layer was formed. However, the capacitance appearance ratios in the Comparative Examples 4 and 5 were 81% and 78%, respectively, i.e., were lower. Therefore, it has been confirmed that, unlike the present disclosure, the effect of improving the capacitance appearance ratio cannot be obtained when the conductive polymer layer is formed after the ionic liquid layer is formed.

Further, in the Comparative Examples 6 and 7, as shown in the Manufacturing Method 5 shown in FIG. 7, the conductive polymer layer was formed on the dielectric oxide film layer by using the material including the ionic liquid. However, the capacitance appearance ratios in the Comparative Examples 6 and 7 were 76% and 73%, respectively, i.e., were lower. Therefore, it has been confirmed that, unlike the present disclosure, the effect of improving the capacitance appearance ratio cannot be obtained when the conductive polymer layer is formed on the dielectric oxide film layer by using the material including the ionic liquid.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An electrolytic capacitor comprising:
a valve metal;
a dielectric oxide film layer formed on a surface of the valve metal;
a surface treatment agent layer formed on the dielectric oxide film layer; and
an electrolyte layer formed on the surface treatment agent layer, wherein
the electrolyte layer comprises a conductive polymer layer and an ionic liquid,
the conductive polymer layer is formed so that the conductive polymer layer is in contact with the surface treatment agent layer,
the surface treatment agent layer includes at least one polar group in a molecular chain on a side of the conductive polymer layer, and
the conductive polymer layer is impregnated with the ionic liquid and the surface treatment agent layer and the ionic liquid attract each other by an intermolecular force or an electrostatic force, whereby at least some of voids present in an interface between the conductive polymer layer and the surface treatment agent layer are filled with the ionic liquid.

2. The electrolytic capacitor according to claim 1, wherein the surface treatment agent layer is made of at least one type of substance selected from a silane coupling agent, a titanate coupling agent, and a phosphonic acid derivative.

3. The electrolytic capacitor according to claim 1, further comprising a cathode layer formed on the electrolyte layer, wherein
the ionic liquid is removed in an interface where the electrolyte layer is in contact with the cathode layer.

4. The electrolytic capacitor according to claim 1, wherein the electrolyte layer comprises:
a first conductive polymer layer comprising the conductive polymer layer and the ionic liquid; and
a second conductive polymer layer formed on the first conductive polymer layer, and
the ionic liquid is removed in an interface where the first conductive polymer layer is in contact with the second conductive polymer layer.

5. The electrolytic capacitor according to claim 1, wherein the ionic liquid is hydrophobic.

* * * * *